United States Patent
Armangau et al.

(10) Patent No.: US 11,347,583 B2
(45) Date of Patent: May 31, 2022

(54) TECHNIQUES FOR CORRECTING ERRORS IN CACHED PAGES

(71) Applicant: EMC IP Holding Company LLC, Hopkinton, MA (US)

(72) Inventors: Philippe Armangau, Acton, MA (US); Vamsi K. Vankamamidi, Hopkinton, MA (US); Geng Han, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 114 days.

(21) Appl. No.: 16/901,520

(22) Filed: Jun. 15, 2020

(65) Prior Publication Data

US 2021/0390015 A1 Dec. 16, 2021

(51) Int. Cl.
*G11C 29/00* (2006.01)
*G06F 11/10* (2006.01)
*G06F 12/0811* (2016.01)

(52) U.S. Cl.
CPC ...... *G06F 11/1064* (2013.01); *G06F 12/0811* (2013.01); *G06F 2212/1032* (2013.01)

(58) Field of Classification Search
CPC ............. G06F 11/1064; G06F 11/1044; G06F 11/1048; G06F 11/106; G06F 12/0811; G06F 12/0806; G06F 12/0846; G06F 12/0853; G06F 2212/1032
USPC ......... 714/763, 764; 711/118, 130, 133, 134
See application file for complete search history.

(56) References Cited

U.S. PATENT DOCUMENTS

| | | | |
|---|---|---|---|
| 9,170,947 B2 * | 10/2015 | Vera | G06F 11/1666 |
| 9,916,191 B1 | 3/2018 | Pan et al. | |
| 10,467,222 B1 | 11/2019 | Kuang et al. | |
| 10,740,284 B1 | 8/2020 | Choudhary et al. | |
| 11,093,317 B1 | 8/2021 | Vankamamidi et al. | |
| 11,163,678 B2 | 11/2021 | Vankamamidi et al. | |
| 2002/0170014 A1 * | 11/2002 | Kocol | G06F 11/1064 |
| | | | 714/763 |
| 2019/0102324 A1 * | 4/2019 | Ozsoy | G06F 12/0831 |
| 2021/0286766 A1 | 9/2021 | Chen et al. | |

* cited by examiner

*Primary Examiner* — Christine T. Tu
(74) *Attorney, Agent, or Firm* — BainwoodHuang

(57) ABSTRACT

A method of correcting errors in a data storage system including a first node, a second node, and shared persistent storage (the first and second nodes being configured to process data storage requests) is provided. The method includes (a) reading cached pages from a first cache disposed within the first node, the cached pages being cached versions of respective persistent pages stored in the shared persistent storage; (b) in response to determining that one of the cached pages is corrupted, requesting that the second node return to the first node a corresponding remote page from a second cache disposed within the second node, the cached page and the remote page each caching a same persistent page of the shared persistent storage; and (c) in response to determining that the remote page received from the second node by the first node is not corrupted, correcting the cached page using the remote page.

18 Claims, 6 Drawing Sheets

TECHNIQUES FOR CORRECTING ERRORS IN CACHED PAGES

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Many storage systems provide tools for checking internal consistency. For example, Linux-based systems may use FSCK (file system consistency check) to check and repair errors in file systems and other data objects. Errors may arise, for example, due to corruption in metadata used to map and organize data of the data objects. These errors can lead to data loss or data unavailability. Modern storage systems include enough redundancy in metadata so that many errors can be repaired.

SUMMARY

Unfortunately, performing a metadata consistency check on a storage system can consume a great deal of time, leading to long periods of data unavailability. It would be desirable to avoid lengthy metadata consistency checking if possible. This may be accomplished by leveraging the existence of multiple copies of metadata in different parts of a data storage system during reads and/or writes while the data storage system remains online. For example, if corruption is detected in a page of metadata stored within a cache of one node of a system, the cache of another node may be checked to obtain an uncorrupted copy with which to correct the corrupted page. Similarly, an underlying page in the shared persistent storage devices may be checked for an uncorrupted copy. As long as one of these sources contains an uncorrupted version of the metadata page, the error can be corrected without needing to perform a lengthy offline metadata consistency check. Similar techniques may also be used to correct corruption within user data pages.

In one embodiment, a method of correcting errors in a data storage system including a first node, a second node, and shared persistent storage (the first and second nodes being configured to process data storage requests) is provided. The method includes (a) reading cached pages from a first cache disposed within the first node, the cached pages being cached versions of respective persistent pages stored in the shared persistent storage; (b) in response to determining that one of the cached pages is corrupted, requesting that the second node return to the first node a corresponding remote page from a second cache disposed within the second node, the cached page and the remote page each caching a same persistent page of the shared persistent storage; and (c) in response to determining that the remote page received from the second node by the first node is not corrupted, correcting the cached page using the remote page. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for minimizing a need to perform offline metadata consistency checking when possible. This may be accomplished by leveraging the existence of multiple copies of metadata in different parts of a data storage system while it remains online and continues to service I/O requests from host applications. For example, a data storage system may include two or more storage processing nodes (SPs), each of which may include its own cache for user data and/or metadata. Such user data and metadata are typically backed by shared persistent storage devices. If corruption is detected in a page of metadata stored in the cache of one SP, it may be possible to check the cache of another SP to obtain an uncorrupted copy with which to correct the corrupted page. Similarly, the underlying page in the shared persistent storage devices may be checked for an uncorrupted copy. In some systems, user data or metadata may be stored temporarily in a non-volatile transaction cache, which is faster than the shared persistent storage. In such cases, a corresponding page in the non-volatile transaction cache may be checked for an uncorrupted copy. As long as one of these sources contains an uncorrupted version of the metadata page, the error can be corrected without needing to perform a lengthy offline metadata consistency check. Similar techniques may also be used to correct corruption within user data pages.

Figure 1:
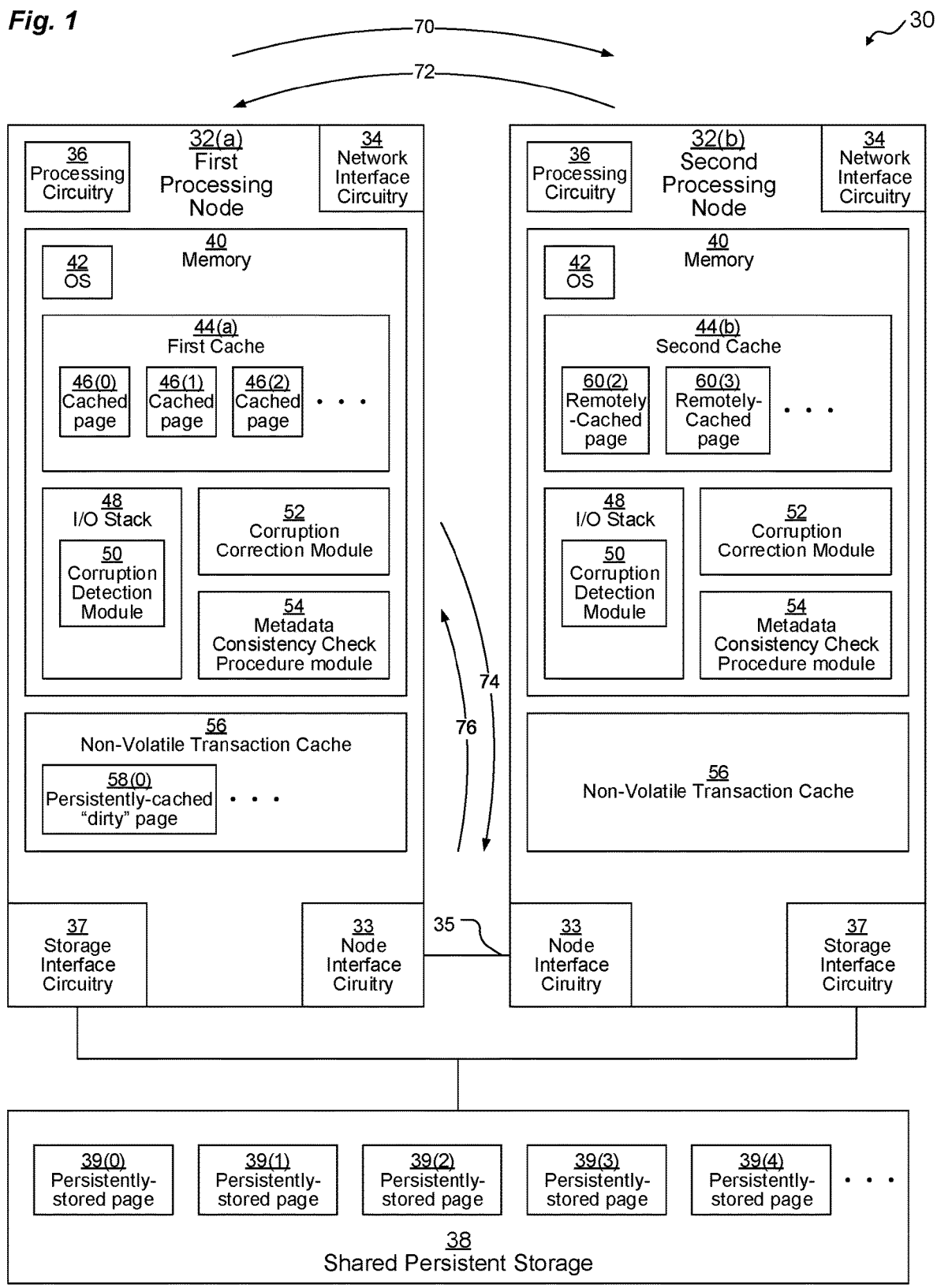
FIG. 1 is a block diagram depicting an example system, apparatus, and data structure arrangement for use in connection with various embodiments.

FIG. 1 depicts an example data storage system (DSS) 30. DSS 30 may be configured as one or more data storage apparatuses/arrays in one or more housings.

DSS 30 includes at least two processing nodes (hereinafter "nodes") 32 (depicted as first processing node 32(*a*) and second processing node 32(*b*)) interconnected by an inter-node bus 35. DSS 30 also includes shared persistent storage 38 communicatively coupled to the nodes 32.

Each node 32 may be any kind of computing device, such as, for example, a personal computer, workstation, server computer, enterprise server, data storage array device, laptop computer, tablet computer, smart phone, mobile computer, etc. In one example embodiment, each node 32 is a blade server, while in another example embodiment, each node 32 is a rack-mount server. In some embodiments, the nodes 32 and the shared persistent storage 38 are both mounted on the same server rack.

Each node 32 at least includes node interface circuitry 33, processing circuitry 36, storage interface circuitry 37, and memory 40. In some embodiments, a node 32 may also include network interface circuitry 34 as well as various other kinds of interfaces (not depicted). In some embodiments, a node 32 may also include a non-volatile transaction cache 56. Nodes 32 also include interconnection circuitry between their various components (not depicted).

Processing circuitry 36 may include any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface circuitry 37 controls and provides access to shared persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage devices (not depicted), such as, for example, hard disk drives, solid-state storage devices (SSDs), flash drives, etc.

Network interface circuitry 34 may include one or more Ethernet cards, cellular modems, Fibre Channel (FC) adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc. Network interface circuitry 34 allows a node 32 to communicate with one or more host devices (not depicted) over the network.

Memory 40 may be any kind of digital system memory, such as, for example, random access memory (RAM). Memory 40 stores an operating system (OS) 42 in operation (e.g., a Linux, UNIX, Windows, MacOS, or similar operating system). Memory 40 also stores an I/O stack 48 configured to process storage requests with respect to the shared persistent storage 38. Memory 40 also stores a cache 44 (depicted as first cache 44(a) on node 32(a) and second cache 44(b) on second node 32(b)), a corruption correction module 52, a metadata consistency check procedure (MCCP) module 54, and other software modules (not depicted) which each execute on processing circuitry 36.

I/O stack 48 is a layered arrangement of drivers and/or other software constructs (not depicted) configured to process I/O storage requests (not depicted), e.g., from remote hosts, directed at the DSS 30. The storage requests, at the top of the I/O stack 48, are high-level requests directed to particular logical disks and logical addresses therein. As the requests proceed down the stack, these are translated into lower-level access requests to particular physical addresses on disks/drives of the shared persistent storage 38. At a low level, shared persistent storage 38 stores a plurality of persistently-stored pages 39 (depicted as persistently-stored pages 39(0), 39(1), 39(2), 39(3), 39(4), . . . ). These pages 39 may include data pages and/or metadata pages and may also be referred to as "blocks." Some of these pages 39 may have corresponding cached pages 46, 60 stored within the cache 44 of a node 32. For example, as depicted, persistently-stored pages 39(0), 39(1), 39(2) correspond to cached pages 46(0), 46(1), 46(2) within first cache 44(a) of first node 32(a). The cached pages 46(0), 46(1), 46(2) are cached versions of persistently-stored pages 39(0), 39(1), 39(2), respectively. Similarly, as depicted, persistently-stored pages 39(2), 39(3) correspond to cached pages 60(2), 60(3) within second cache 44(b) of second node 32(b). The cached pages 60(2), 60(3) are cached versions of persistently-stored pages 39(2), 39(3), respectively. I/O stack 48 includes a corruption detection module 50 therein. Upon I/O stack 48 reading a particular cached page 46 within first cache 44(a), corruption detection module 50 of first node 32(a) determines if that page 46 has any corruption (e.g., by checking for internal inconsistencies, such as by utilizing a checksum or cyclic redundancy check). If such corruption is detected, in some cases, depending on the embodiment, corruption detection module 50 calls the corruption correction module 52 to attempt error correction of the cached page 46. In some embodiments, if corruption correction module 52 is unsuccessful in correcting the error in a metadata page, then it may call upon MCCP module 54 to perform a more burdensome, offline MCCP. Embodiments preferably avoid this outcome, however, if correction or adaptation can be performed without the need to take the DSS 30 offline.

MCCP module 54 may be activated when system metadata requires a consistency check (e.g., if any corruption is noticed that cannot be corrected by other means). In some embodiments, once an MCCP is initiated, all logical disks that share the same metadata are taken off-line. In other embodiments, the logical disks may remain online in a read-only mode. Once activated, MCCP module 54 performs a cross-check of all metadata, correcting errors where found. One example implementation of an MCCP is described in U.S. patent application Ser. No. 16/819,722 (filed Mar. 16, 2020), incorporated herein by this reference.

In some embodiments, a node 32 may contain a non-volatile transaction cache 56. Non-volatile transaction cache 56 is a persistent cache that is faster than the shared persistent storage 38, such as, for example, flash memory, 3D XPoint memory produced by Intel Corp. and Micron Corp., and other similar technologies. As the non-volatile transaction cache 56 is persistent, the contents of the non-volatile transaction cache 56 are preserved upon a restart of the node 32. Thus, when data or metadata is updated within a cache 44 (or elsewhere in memory 40), it may be stored forthwith in the non-volatile transaction cache 56. This arrangement enables an incoming write request to be acknowledged immediately upon storage of its data in the non-volatile transaction cache 56, even though such data has not yet been persisted to the shared persistent storage 38. Thus, for example, as depicted, non-volatile transaction cache 56 of first node 32(a) may store a "dirty" version 58(0) of a page, which differs from a corresponding persistently-stored version 39(0) of the same page. The page 58(0) in the non-volatile transaction cache 56 is considered "dirty" because it is more up-to-date than the corresponding persistently-stored page 39(0) because it has not yet been flushed to shared persistent storage 38.

Memory 40 may also store various other data structures used by the OS 42, I/O stack 48, corruption detection module 50, corruption correction module 52, MCCP module 54, and various other applications and drivers. In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or shared persistent storage 38 is configured to store programs and data even while the node 32 is powered off. The OS 42, I/O stack 48, corruption detection module 50, corruption correction module 52, MCCP module 54, and various other applications and drivers are typically stored in this persistent storage portion of memory 40 or on shared persistent storage 38 so that they may be loaded into a system portion of memory 40 upon a system restart or as needed. The OS 42, I/O stack 48, corruption detection module 50, corruption correction module 52, MCCP module 54, and various other applications and drivers, when stored in non-transitory form either in the volatile portion of memory 40 or on shared persistent storage 38 or in persistent portion of memory 40, each form a computer program product. The processing circuitry 36 running one or more applications thus forms a specialized circuit constructed and arranged to carry out the various processes described herein.

In example operation, upon the corruption detection module 50 of first node 32(a) detecting corruption in a particular cached page 46(X) within first cache 44(a), corruption correction module 52 sends a request 70 to one or more peer nodes 32 (e.g., to second node 32(b)) over inter-node bus 35, requesting that that node 32 return its own cached version of the cached page 46(X), if it exists in its cache 44 (e.g., within second cache 44(b)). In response, the second node 32(b) checks second cache 44(b) for a corresponding cached page 60(X). Second node 32(b) then sends back a response 72 that either includes a copy of the corresponding cached page 60(X) or an indication that a corresponding page was not found.

For example, as depicted in FIG. 1, if corruption was found in cached page 46(0) or 46(1), then response 72 from second node 32(b) would indicate that no corresponding page was found, as there is no corresponding remotely-cached page 60(0) or 60(1) within the second cache 44(b). However, if corruption was found in cached page 46(2), then response 72 from second node 32(b) would include a copy of corresponding remotely-cached page 60(2), as that page is found in second cache 44(b).

If a corresponding cached page 60(X) is received by the corruption correction module 52 of first node 32(a), then it checks the received corresponding cached page 60(X) for corruption (e.g., by calling corruption detection module 50). If no corruption is found in the received corresponding cached page 60(X), then corruption correction module 52 of first node 32(a) corrects the cached page 46(X) within first cache 44(a) by using the received corresponding cached page 60(X) (e.g., replacing the cached page 46(X) within first cache 44(a) with the received corresponding cached page 60(X)).

However, if either no corresponding cached page 60(X) was received in a response 72 or if such page was found to also be corrupted, then corruption detection module 50 of first node 32(a) sends a request 74 down to shared persistent storage 38 for the corresponding persistently-stored page 39(X) that backs the cached page 46(X). In some embodiments, this may include first checking with (or being intercepted by) the non-volatile transaction cache 56 of the first node 32(a) for a corresponding persistently-cached dirty page 58(X). In response, shared persistent storage 38 (or non-volatile transaction cache 56) returns a response 76 that includes the corresponding persistently-stored page 39(X) (or the corresponding persistently-cached dirty page 58(X)).

For example, as depicted in FIG. 1, if corruption was found in cached page 46(1) or 46(2) and second cache 44(b) did not contain an uncorrupted corresponding version, then shared persistent storage 38 would return the corresponding persistently-stored page 39(1) or 39(2) within response 76. However, if corruption was found in cached page 46(0) and second cache 44(b) did not contain an uncorrupted corresponding version, then, because there is a corresponding persistently-cached dirty page 58(0) in the non-volatile transaction cache 56 of first node 32(a), non-volatile transaction cache 56 would return the corresponding persistently-cached dirty page 58(0) within response 76.

In response to receiving response 76, corruption correction module 52 checks (e.g., by sending to corruption detection module 50) the received corresponding persistently-stored page 39(X) or persistently-cached dirty page 58(X) for corruption. If no corruption is found in the received corresponding persistently-stored page 39(X) or persistently-cached dirty page 58(X), then corruption correction module 52 of first node 32(a) corrects the cached page 46(X) within first cache 44(a) using the received corresponding persistently-stored page 39(X) or persistently-cached dirty page 58(X) (e.g., replacing the cached page 46(X) within first cache 44(a) with the received corresponding persistently-stored page 39(X) or persistently-cached dirty page 58(X)). Otherwise, corruption correction module 52 invokes MCCP module 54 (or, in some embodiments, corruption correction module 52 may instead schedule the MCCP module 54 to be invoked at a later time or advise an administrator to invoke MCCP module 54 when practical).

Figure 2:
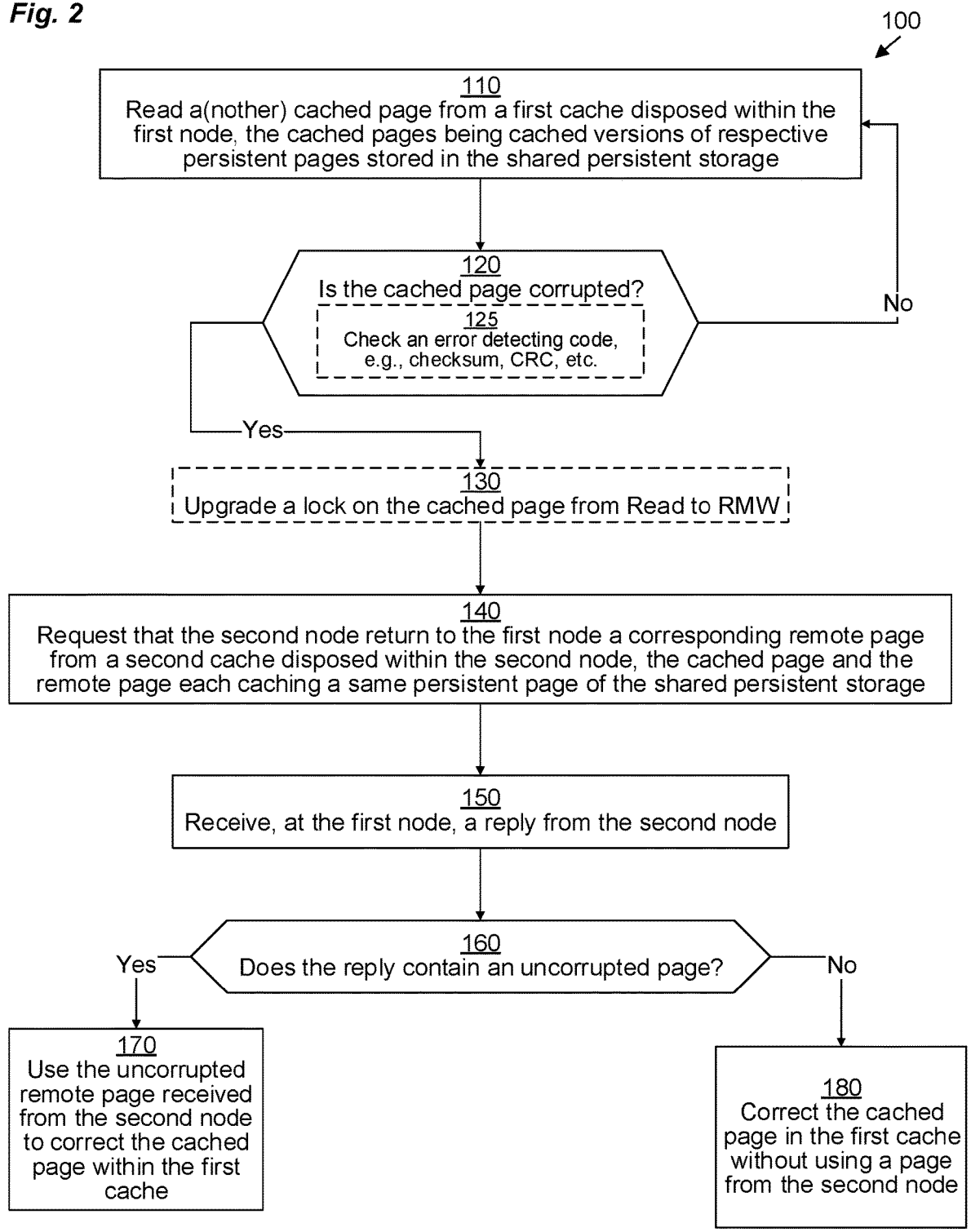
FIG. 2 is a flowchart depicting an example procedure according to various embodiments.

FIG. 2 illustrates an example method 100 performed by a first node 32(a) for correcting errors in a data storage system 30. It should be understood that any time a piece of software (e.g., OS 42, I/O stack 48, corruption detection module 50, corruption correction module 52, MCCP module 54, etc.) is described as performing a method, process, step, or function, what is meant is that a computing device (e.g., a node 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, I/O stack 48 of the first node 32(a) reads a cached page 46(X) from first cache 44(a). Then, in step 120, corruption detection module 50 determines whether or not the cached page 46(X) is corrupted. In some embodiments, step 130 includes sub-step 125, in which the determination is made by checking with an error detecting code, such as a checksum or cyclic redundancy check (CRC) code embedded within the page 46(X) or stored in another location. If no corruption is found, then operation proceeds as normal, and another cached page 46 may be read, returning to step 110, as needed.

However, if corruption is detected in step 120, then operation proceeds with either optional step 130 or directly with step 140. In optional step 130, if I/O stack 48 currently has a Read lock on the cached page 46(X) (which means that no process executing on any of the nodes 32 is permitted to write to or modify that cached page 46(X) or any of its corresponding versions stored elsewhere such as 60(X), 58(X), or 39(X)), then I/O stack upgrades the Read lock to instead be a Read-Write-Modify (RMW) lock (which means that no other process executing on any of the nodes 32 is permitted to read, write to, or modify that cached page 46(X) or any of its corresponding versions stored elsewhere such as 60(X), 58(X), or 39(X)).

In step 140, corruption correction module 52 of first node 32(a) sends a request 70 to the second node 32(b) requesting that the second node 32(b) return to the first node 32(a) a corresponding remote page 60(X) from the second cache 44(b) disposed within the second node 32(b), the cached page 46(X) and the remote page 60(X) each caching a same persistent page 39(X) of the shared persistent storage 38.

In response, in step 150, corruption correction module 52 of first node 32(a) receives a reply 72 from the second node 32(b). Corruption correction module 52 then determines, in step 160, whether or not the received reply 72 includes an uncorrupted copy of the requested corresponding remote page 60(X). Further details of step 160 are provided below in connection with FIG. 3.

If step 160 returns an affirmative result, then, in step 170, corruption correction module 52 of first node 32(a) uses the uncorrupted remote page 60(X) received from the second node 32(b) to correct the cached page 46(X) within the first cache 44(b). For example, in one embodiment, corruption correction module 52 may copy the received uncorrupted remote page 60(X) into the first cache 44(b) in place of the original copy of the cached page 46(X). Alternatively, in another embodiment, the cached page 46(X) may be compared to the received uncorrupted remote page 60(X), and the differences may be copied from the received uncorrupted remote page 60(X) to the cached page 46(X) within the first cache 44(b).

If step 160 returns a negative result, then, in step 180, corruption correction module 52 of first node 32(a) corrects the cached page 46(X) in the first cache 44(a) without using a page 60 from the second node 32(b). Example implementations of step 160 are described in more detail below in connection with FIG. 4.

Figure 3:
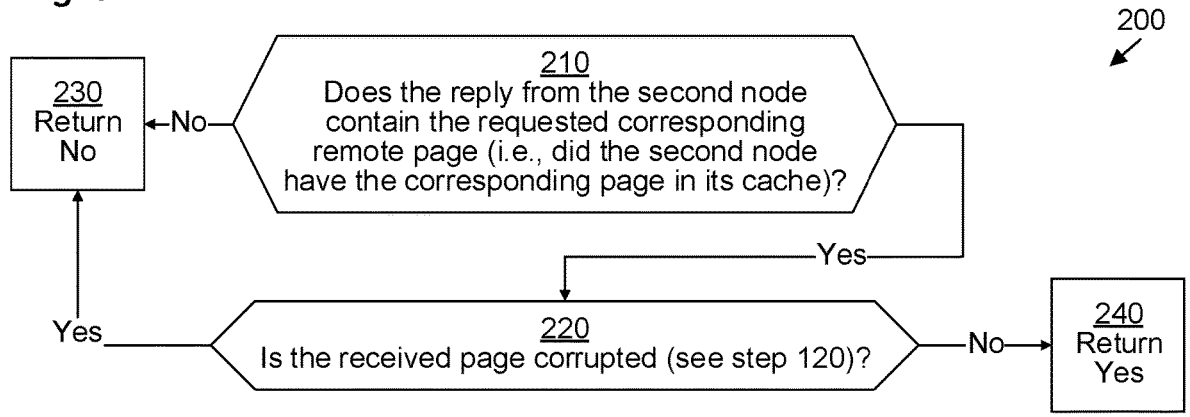
FIG. 3 is a flowchart depicting an example procedure according to various embodiments.

FIG. 3 illustrates an example method 200 performed by first node 32(a) for implementing step 160 of method 100. It should be understood that one or more of the steps or sub-steps of method 200 may be omitted in some embodiments. Similarly, in some embodiments, one or more steps or sub-steps may be combined together or performed in a different order.

In step 210, corruption correction module 52 determines whether or not the reply 72 from the second node 32(b) contains the requested corresponding remote page 60(X) (i.e., does the second node 32(b) have the corresponding page 60(X) in its cache 44(b) at all?). If so, operation proceeds with step 220. Otherwise, operation proceeds with step 230, in which method 200 returns a negative value for step 160 of method 100.

In step 220, corruption correction module 52 determines whether or not the received corresponding remote page 60(X) is corrupted. This step 220 may involve calling corruption detection module 50 of first node 32(a) as in step 120. If the received corresponding remote page 60(X) is corrupted, then operation proceeds with step 230, in which method 200 returns a negative value for step 160 of method 100. Otherwise, if the received corresponding remote page 60(X) is not corrupted, then operation proceeds with step 240, in which method 200 returns an affirmative value for step 160 of method 100.

Figure 4:
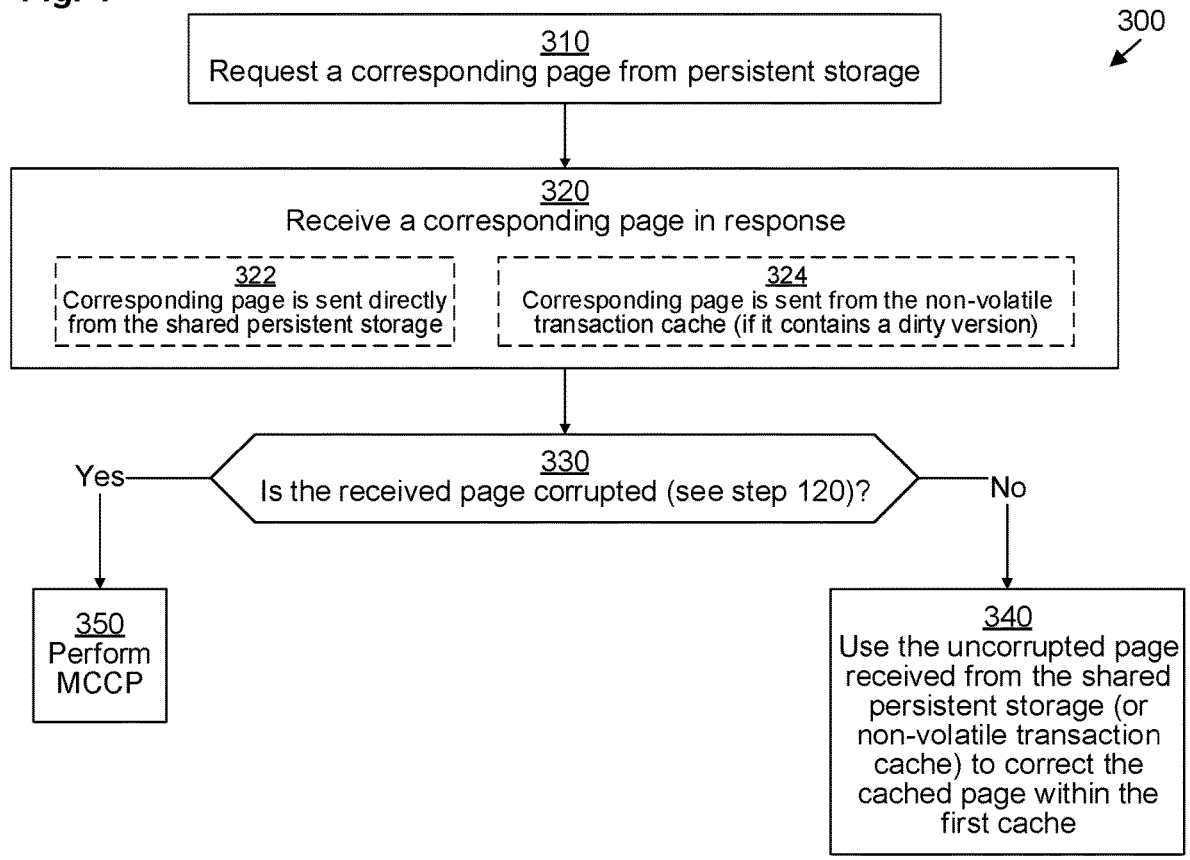
FIG. 4 is a flowchart depicting an example procedure according to various embodiments.

FIG. 4 illustrates an example method 300 performed by first node 32(a) for implementing step 180 of method 100. It should be understood that one or more of the steps or sub-steps of method 300 may be omitted in some embodiments. Similarly, in some embodiments, one or more steps or sub-steps may be combined together or performed in a different order. Dashed lines indicate that sub-steps are either optional or representative of alternate embodiments or use cases.

It should be understood that, in some embodiments (not depicted), step 180 of method 100 may bypass all of method 300 except for step 350. In other embodiments (not depicted), step 180 of method 100 may repeat steps 140-170 with respect to one or more other peer nodes 32 (not depicted) aside from second peer node 32(b) prior to progressing to method 300, if necessary.

In step 310, corruption correction module 52 of first node 32(a) sends a request 74 for a corresponding persistently-stored page 39(X) to shared persistent storage 38 (or to a driver, not depicted, that manages low-level access to shared persistent storage 38).

In response, in step 320, corruption correction module 52 of first node 32(a) receives a reply 76 containing the requested corresponding persistently-stored page 39(X). Step 320 may include sub-step 322 in which the requested corresponding persistently-stored page 39(X) is sent directly from the shared persistent storage 38 (possibly by way of a driver). In some embodiments, if the non-volatile transaction cache 56 of the first node 32(a) (or a non-volatile transaction cache 56 of a peer node 32) contains a corresponding persistently-cached "dirty" page 58(X), then, step 320 may instead include sub-step 324 in which the corresponding persistently-cached dirty page 58(X) is sent from the non-volatile transaction cache 56 instead.

Then, in step 330, corruption correction module 52 determines whether or not the received corresponding persistently-stored page 39(X) or corresponding persistently-cached dirty page 58(X) is corrupted. This step 330 may involve calling corruption detection module 50 of first node 32(a) as in step 120. If the received corresponding persistent page 39(X) or 58(X) is corrupted, then operation proceeds with step 350, in which corruption correction module 52 invokes MCCP module 54 (or, in some embodiments, corruption correction module 52 may instead schedule the MCCP module 54 to be invoked at a later time or advise an administrator to invoke MCCP module 54 when practical).

Otherwise, if the received corresponding persistent page 39(X) or 58(X) is not corrupted, then operation proceeds with step 340, in which corruption correction module 52 of first node 32(a) uses the uncorrupted page 39(X) or 58(X) received in reply 76 to correct the cached page 46(X) within the first cache 44(b). For example, in one embodiment, corruption correction module 52 may copy the received uncorrupted page 39(X) or 58(X) into the first cache 44(b) in place of the original copy of the cached page 46(X). Alternatively, in another embodiment, the cached page 46(X) may be compared to the received uncorrupted page 39(X) or 58(X), and the differences may be copied from the received uncorrupted page 39(X) or 58(X) to the cached page 46(X) within the first cache 44(b).

Although as described above, method 100 (and associated method 200) can be performed for any kind of cached pages 46, in some embodiments, method 100 may be limited to only being performed on metadata pages. Thus, FIGS. 5A and 5B depict example data structure arrangements 400, 400' in connection with example embodiments in which method 100 is performed on metadata pages.

Figure 5A:
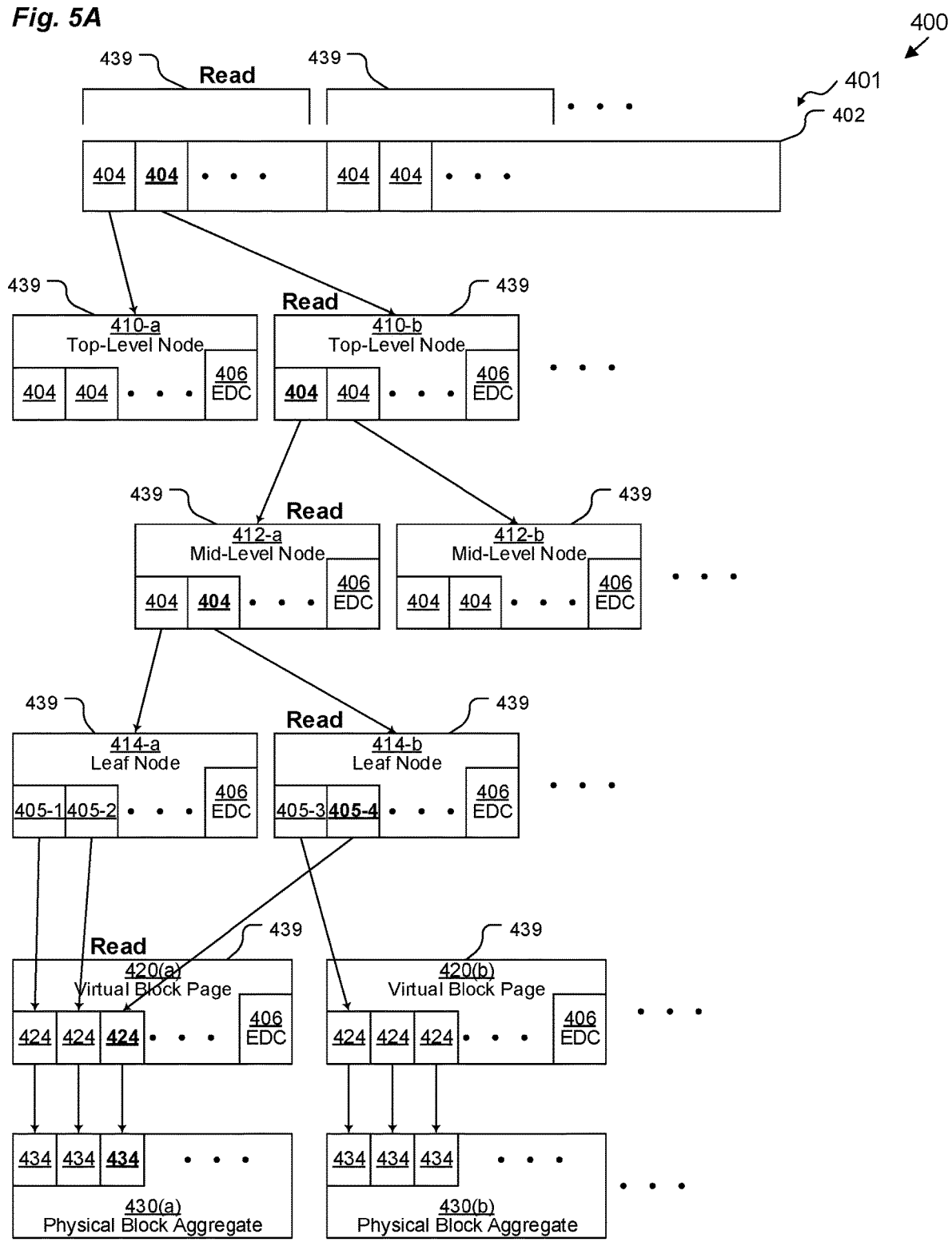
FIGS. 5A and 5B are block diagrams depicting example data structure arrangements for use in connection with various embodiments.
Figure 5B:
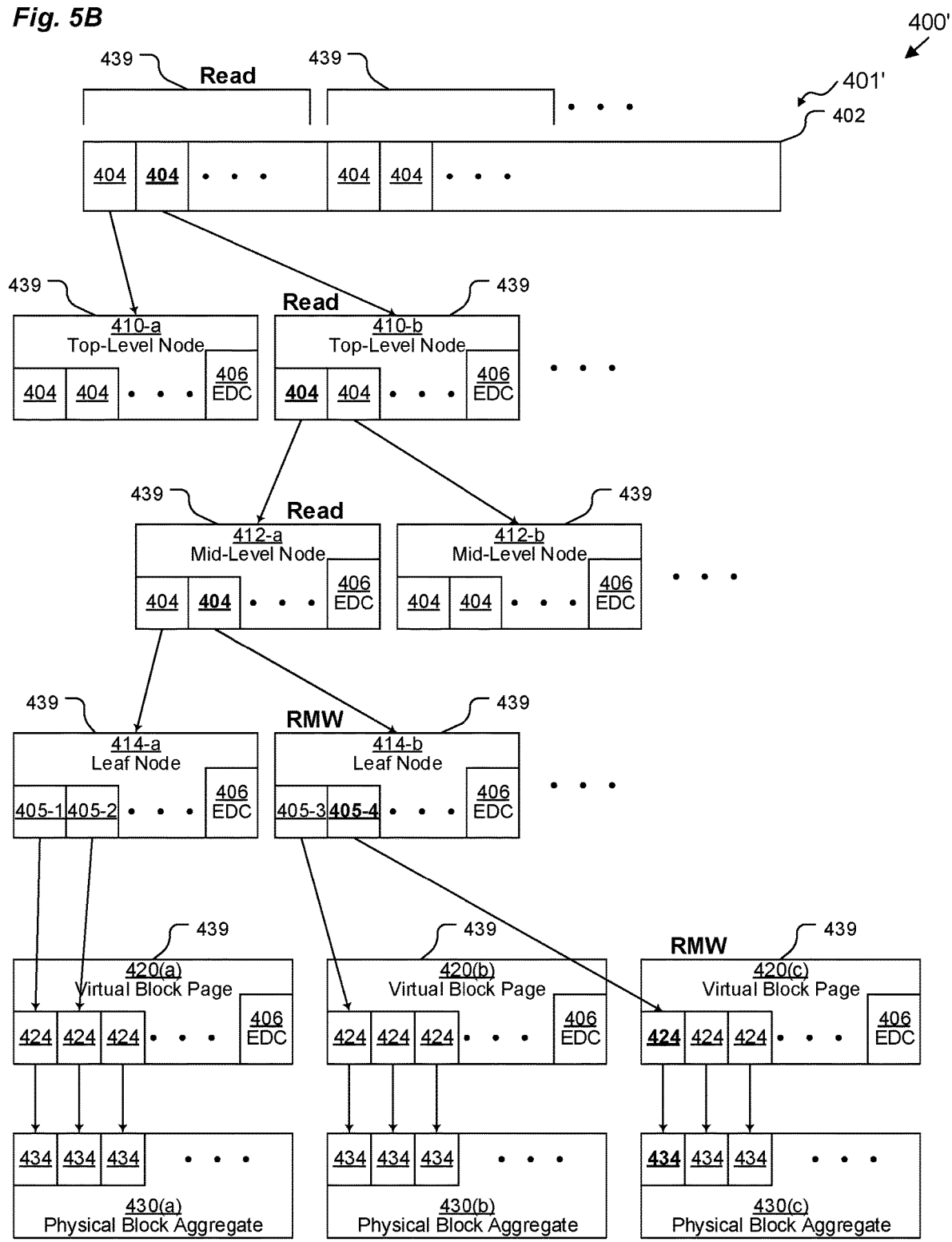

FIG. 5A depicts an example data structure arrangement 400 in the context of performing a READ operation on user data stored in the shared persistent storage 38. Arrangement 400 includes a metadata tree 401 for locating pages 434 of user data.

Metadata tree 401 is a B-tree (or a B-tree-like structure), and it includes a root structure 402, a set of top-level nodes 410 (depicted as top-level nodes 410-a, 410-b, ... ), a set of mid-level nodes 412 (depicted as mid-level nodes 412-a, 412-b, ... ), a set of leaf nodes 414 (depicted as leaf nodes 414-a, 414-b, ... ), and a set of virtual block pages (depicted as virtual block pages 420(*a*), 420(*b*), . . . ). Position within the metadata tree 401 indicates an address or address range.

The metadata tree 401 may address a very large logical address space, such as, for example eight petabytes (PB). Each entry in the root structure is a node pointer 404 that points to a top-level node 410. A top-level node 410 contains a plurality of node pointers 404 that each point to a mid-level node 412. A mid-level node 412 contains a plurality of node pointers 404 that each point to a leaf node 414. A leaf node 414 contains a plurality of virtual block pointers 424 that each point to a virtual block entry 424 within a virtual block page 420. As depicted each node 410, 412, 414 is implemented as a metadata page 439. In some embodiments, each metadata page 439 is four kilobytes (KB), holding up to 512 node pointers 404 or virtual block pointers 405 plus a header and/or footer, which may contain an EDC 406. The root structure 402 may also be made up of a plurality of metadata pages 439, each of which stores 512 node pointers 404.

Each virtual block page 420 is also a metadata page 439 containing a plurality of virtual block entries 424 and an EDC 406. Each virtual block entry 424 points to a user data block 434, and several user data blocks 434 may be aggregated together into a physical block aggregate 430.

In one embodiment, a physical block aggregate 430 is two megabytes, and a physical block 434 is 4 KB. In some embodiments, each physical block 434 may be compressed, allowing up to 2048 compressed physical blocks 434 to be stored within a single physical block aggregate 430.

As depicted, the READ operation is directed at the third physical block 434 from the left within physical block aggregate 430(*a*), which has a logical address corresponding to the position of pointer 405-4 (part of leaf node 414-*b*) within the metadata tree 401. In order to read that physical block 434, it must be located, which involves traversing the metadata tree 401 and reading several metadata pages 439 along the way, including one metadata page 439 of each of the root structure 402, top-level node 410-*b*, mid-level node 412-*a*, leaf node 414-*b*, and virtual block page 420(*a*). Thus, fulfilling a READ operation on a single page 434 of user data involves reading at least five metadata pages 439.

FIG. 5B depicts a related example data structure arrangement 400' in the context of performing a WRITE operation overwriting user data stored in the shared persistent storage 38. As depicted, the logical address corresponding to pointer 405-4 is being changed to point to a new physical block 434 of user data within new physical block aggregate 430(*c*). Performing this WRITE operation involves traversing the metadata tree 401 and reading several metadata pages 439 along the way, including one metadata page 439 of each of the root structure 402, top-level node 410-*b*, and mid-level node 412-*a*. It also involves a RMW of leaf node 414-*b*, and virtual block page 420(*c*). Thus, fulfilling this WRITE operation on a single page 434 of user data involves reading at least three metadata pages 439 and performing a RMW on at least two metadata pages 439.

Figure 6:
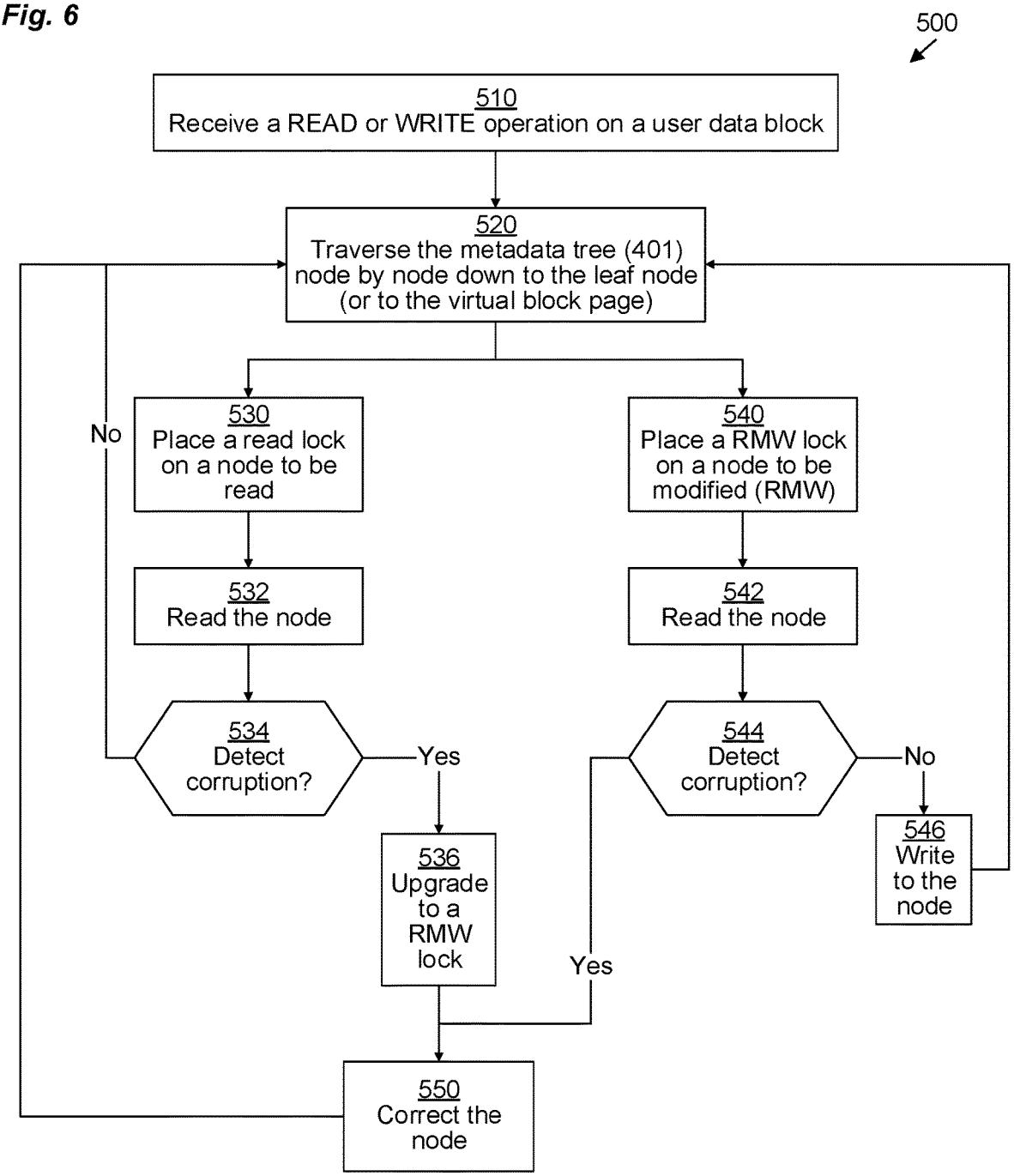
FIG. 6 is a flowchart depicting an example procedure according to various embodiments.

FIG. 6 depicts a method 500 performed by a first node 32(*a*) for correcting errors in metadata pages 439 of a data storage system 30. It should be understood that one or more of the steps or sub-steps of method 100 may be omitted in some embodiments. Similarly, in some embodiments, one or more steps or sub-steps may be combined together or performed in a different order.

It should be understood that method 500 overlaps to an extent with method 100, but it is described from a different perspective and particularly in the context of detecting and correcting corruption in metadata pages 439.

In step 510, I/O stack 48 receives a READ or a WRITE operation on a block 434 of user data at a particular address. Then, in step 520, I/O stack 48 traverses the metadata tree 401 in order to locate the block 434 of user data. As the metadata tree 401 is traversed, each metadata page 439 that is traversed is either read or read, modified, and written to (RMW). For a READ operation, all the traversed metadata pages 439 are read, proceeding with step 530.

In step 530, I/O stack 48 places a read lock on the metadata page 439, which prevents any other process from writing (or RMW) to that metadata page 439, whether it is stored on shared persistent storage as a persistently-stored page 39 or a cached page 46, 60, 58. Then, in step 532, I/O stack 48 reads that metadata page 439 (see step 110 of method 100). This step involves reading the metadata page 439 from the local cache 44(*a*). If that metadata page is not yet loaded into the local cache 44(*a*), then it is first loaded into the local cache 44(*a*) from the shared persistent storage 38 or non-volatile transaction cache 56.

In step 534, corruption detection module 50 checks that metadata page 439 for corruption (see step 120 of method 100). If no corruption is detected, then operation returns back to step 520 to continue traversing the metadata tree 401. If corruption is detected, then operation proceeds with step 536, in which I/O stack upgrades the read lock to a RMW lock for that metadata page (see step 130 of method 100). Then, in step 550, corruption correction module 52 (and, in some cases, also MCCP module 54) corrects that metadata page 439 within the local cache 44(*a*) (see steps 140-180 of method 100), after which operation may loop back to step 520.

For a WRITE operation, some of the traversed metadata pages 439 are read, proceeding with step 530 as with a READ operation. However, some of the traversed metadata pages 439 (e.g., leaf node 414-*b* and virtual block page 420(*c*) in the example of FIG. 5B) are read, modified, and written to (RMW), proceeding with step 540.

In step 540, I/O stack 48 places a RMW lock on the metadata page 439, which prevents any other process from reading or writing (or RMW) to that metadata page 439, whether it is stored on shared persistent storage as a persistently-stored page 39 or a cached page 46, 60, 58. Then, in step 542, I/O stack 48 reads that metadata page 439 (see step 110 of method 100). This step involves reading the metadata page 439 from the local cache 44(*a*). If that metadata page is not yet loaded into the local cache 44(*a*), then it is first loaded into the local cache 44(*a*) from the shared persistent storage 38 or non-volatile transaction cache 56.

In step 544, corruption detection module 50 checks that metadata page 439 for corruption (see step 120 of method 100). If no corruption is detected, then, in step 546, I/O stack 48 modifies that metadata page 439 (e.g., by changing pointer 405-4 to point to a virtual block entry 424 on virtual block page 420(*c*) as in FIG. 5B instead of to a virtual block entry 424 on virtual block page 420(*a*) as in FIG. 5A) and loops back to step 520 to continue traversing the metadata tree 401. Otherwise, if corruption is detected, operation proceeds with step 550, in which corruption correction module 52 (and, in some cases, also MCCP module 54) corrects that metadata page 439 within the local cache 44(*a*) (see steps 140-180 of method 100), after which operation may loop back to step 520.

Thus, techniques have been presented for minimizing a need to perform metadata consistency checking (e.g., by MCCP module 54) when possible. This may be accomplished by leveraging the existence of multiple copies of metadata (e.g., metadata pages 439) in different parts of a data storage system 30 while it remains online and continues to service I/O requests from host applications. For example, a data storage system 30 may include two or more storage processing nodes (SPs) 32(*a*), 32(*b*), each of which may include its own cache 44 for user data and/or metadata. Such user data and metadata are typically backed by shared persistent storage 38. If corruption is detected in a page 46, 439 of metadata stored in the cache 44(*a*) of one SP 32(*a*), it may be possible to check the cache 44(*b*) of another SP 32(*b*) to obtain an uncorrupted copy 60 with which to correct the corrupted page 46. Similarly, the underlying page 39 in the shared persistent storage 38 may be checked for an uncorrupted copy. In some systems, user data or metadata may be stored temporarily in a non-volatile transaction cache 56, which is faster than the shared persistent storage 38. In such cases, a corresponding page 58 in the non-volatile transaction cache 56 may be checked for an uncorrupted copy. As long as one of these sources contains an uncorrupted version of the metadata page, the error can be corrected without needing to perform a lengthy offline metadata consistency check. Similar techniques may also be used to correct corruption within user data pages.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method of correcting errors in a data storage system, the data storage system including a first node, a second node, and shared persistent storage, the first and second nodes configured to process data storage requests, the method comprising:

reading cached pages from a first cache disposed within the first node, the cached pages being cached versions of respective persistent pages stored in the shared persistent storage;

in response to determining that one of the cached pages is corrupted, requesting that the second node return to the first node a corresponding remote page from a second cache disposed within the second node, the corrupted cached page and the remote page each caching a same persistent page of the shared persistent storage;

in response to determining that the remote page received from the second node by the first node is not corrupted, correcting the corrupted cached page using the remote page;

in response to determining that another cached page from the first cache is corrupted, requesting that the second node return to the first node a corresponding other remote page from the second cache; and in response to one of (a) the second cache not storing a corresponding other remote page as requested and (b) determining that the corresponding other remote page stored in the second cache is corrupted: correcting the other corrupted cached page without using the corresponding other remote page.

2. The method of claim 1 wherein the cached pages are metadata pages that store metadata regarding user data stored within the data storage system.

3. The method of claim 2 wherein correcting the other corrupted cached page without using the corresponding other remote page includes performing a metadata consistency check procedure (MCCP) to correct errors within the metadata by cross-checking all metadata pages stored within a metadata portion of the shared persistent storage.

4. The method of claim 3 wherein the method further comprises, prior to performing the MCCP:

requesting that the persistent shared storage return to the first node a corresponding persistent page that backs the other cached page; and determining that the corresponding persistent page is also corrupted.

5. The method of claim 4 wherein the method further comprises, in response to requesting that the persistent shared storage return to the first node the corresponding persistent page, receiving, by the first node, the corresponding persistent page from a persistent write cache, the persistent write cache configured to store metadata to be written to the shared persistent storage prior to being flushed to the shared persistent storage.

6. The method of claim 2 wherein reading cached pages from the first cache is part of fulfilling one of (1) a user data READ operation and (2) a user data WRITE operation, wherein fulfilling the user data READ or WRITE operation includes reading metadata pages that store location information that allows the user data to be located.

7. The method of claim 6 wherein the data READ or WRITE operation is a user data WRITE operation, and wherein fulfilling the user data WRITE operation further includes performing a read-modify-write on metadata pages that currently store old location information that allows the user data to be located, including overwriting the old location information with new location information.

8. The method of claim 6 wherein the method further includes, prior to requesting that the second node send to the first node the corresponding other remote page from the second cache, upgrading a read lock on the other cached page to a read-modify-write lock.

9. The method of claim 1 wherein correcting the other corrupted cached page without using the corresponding other remote page includes:
   requesting that the persistent shared storage return to the first node a corresponding persistent page that backs the other cached page; and
   in response to determining that the corresponding persistent page received from the persistent shared storage by the first node is not corrupted, correcting the other cached page using the corresponding persistent page.

10. The method of claim 1 wherein correcting the other corrupted cached page without using the corresponding other remote page includes:
    requesting that a third node of the data storage system send to the first node yet another corresponding remote page from a third cache disposed within the third node, the other corrupted cached page and the yet other corresponding remote page each caching a same persistent page stored in the persistent storage; and
    in response to determining that the yet other corresponding remote page received from the third node by the first node is not corrupted, correcting the other cached page using the yet other corresponding remote page.

11. The method of claim 1 wherein determining that the remote page received from the second node by the first node is not corrupted includes:
    receiving, by the first node, the remote page from the second node; and
    determining, by the first node, that the remote page is not corrupted.

12. The method of claim 11 wherein determining that the remote page is not corrupted includes checking an error detecting code for internal inconsistency within the page.

13. The method of claim 12 wherein checking the error detecting code for internal inconsistency within the page includes applying a checksum.

14. The method of claim 12 wherein checking the error detecting code for internal inconsistency within the page includes applying a cyclic redundancy check.

15. A data storage apparatus comprising:
    a first node including first processing circuitry coupled to memory and a first cache;
    a second node including second processing circuitry coupled to memory and a second cache, the first and second nodes being configured to process data storage requests; and
    shared persistent storage;
    wherein the first processing circuitry coupled to memory is configured to cause the first node to:
       read cached pages from the first cache, the cached pages being cached versions of respective persistent pages stored in the shared persistent storage;
       in response to determining that one of the cached pages is corrupted, request that the second node return to the first node a corresponding remote page from the second cache, the corrupted cached page and the remote page each caching a same persistent page of the shared persistent storage;
       in response to determining that the remote page as received from the second node by the first node is not corrupted, correct the corrupted cached page using the remote page;
       in response to one of (a) the second cache not storing a corresponding remote page as requested and (b) a determination that the corresponding remote page stored in the second cache is corrupted: correct the corrupted cached page without using the corresponding remote page.

16. The data storage apparatus of claim 15 wherein the cached pages are metadata pages that store metadata regarding user data stored within the data storage apparatus.

17. The data storage apparatus of claim 15 wherein correcting the corrupted cached page without using the corresponding remote page includes:
    requesting that the persistent shared storage return to the first node a corresponding persistent page that backs the corrupted cached page; and
    in response to determining that the corresponding persistent page received from the persistent shared storage by the first node is not corrupted, correcting the corrupted cached page using the corresponding persistent page.

18. A computer program product comprising a non-transitory computer-readable storage medium storing a set of instructions, which, when performed by a computing device including a first node, a second node, and shared persistent storage, the first and second nodes being configured to process data storage requests, causes the computing device to correct errors by:
    reading cached pages from a first cache disposed within the first node, the cached pages being cached versions of respective persistent pages stored in the shared persistent storage;
    in response to determining that one of the cached pages is corrupted, requesting that the second node return to the first node a corresponding remote page from a second cache disposed within the second node, the corrupted cached page and the remote page each caching a same persistent page of the shared persistent storage;
    in response to determining that the remote page received from the second node by the first node is not corrupted, correcting the corrupted cached page using the remote page;
    in response to determining that another cached page from the first cache is corrupted, requesting that the second node return to the first node a corresponding other remote page from the second cache; and
    in response to one of (a) the second cache not storing a corresponding other remote page as requested and (b) determining that the corresponding other remote page stored in the second cache is corrupted: correcting the other corrupted cached page without using the corresponding other remote page.

* * * * *